(12) United States Patent
Isom

(10) Patent No.: US 8,898,655 B2
(45) Date of Patent: *Nov. 25, 2014

(54) MODIFYING AN INFORMATION TECHNOLOGY ARCHITECTURE FRAMEWORK

(71) Applicant: International Business Machines Corporation, Armonk, NY (US)

(72) Inventor: Pamela K. Isom, Highlands Ranch, CO (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/965,535

(22) Filed: Aug. 13, 2013

(65) Prior Publication Data

US 2013/0332915 A1    Dec. 12, 2013

Related U.S. Application Data

(63) Continuation of application No. 12/169,749, filed on Jul. 9, 2008, now Pat. No. 8,549,509.

(51) Int. Cl.
*G06F 9/455* (2006.01)
*G06F 11/00* (2006.01)
*G06F 9/445* (2006.01)
*G06Q 10/06* (2012.01)

(52) U.S. Cl.
CPC ...... *G06F 8/65* (2013.01); *G06Q 10/06* (2013.01); *G06F 9/455* (2013.01)
USPC .............................. 717/168; 717/171; 703/21

(58) Field of Classification Search
USPC ........................................................ 717/171
See application file for complete search history.

(56) References Cited

U.S. PATENT DOCUMENTS

| | | | |
|---|---|---|---|
| 6,587,970 B1 | 7/2003 | Wang et al. | |
| 7,353,257 B2 | 4/2008 | Pettigrew et al. | |
| 2004/0015556 A1 | 1/2004 | Chopra | |
| 2006/0070077 A1 | 3/2006 | Erlandson et al. | |
| 2008/0115215 A1 | 5/2008 | Bardsley | |
| 2008/0301651 A1* | 12/2008 | Seneski et al. | 717/135 |
| 2009/0037869 A1 | 2/2009 | Hamilton et al. | |
| 2009/0204845 A1 | 8/2009 | Herscovitz et al. | |

OTHER PUBLICATIONS

Hudyma, R., et al, "Causes of Failure in It Telecommunications Networks", Proceedings of Sci 2004, Florida, 2004, pp. 35-38.
U.S. Appl. No. 12/169,749—Final Office Action mailed Jul. 31, 2012.
U.S. Appl. No. 12/169,749—Non-Final Office Action mailed Nov. 23, 2011.

\* cited by examiner

*Primary Examiner* — Li B Zhen
*Assistant Examiner* — Joanne Macasiano
(74) *Attorney, Agent, or Firm* — John R. Pivnichny; Law Office of Jim Boice

(57) ABSTRACT

A computer-based analysis of an enterprise computer system is utilized to remove bottlenecks that cause the enterprise computer system to operate in a non-optimal or risky manner. Contents of e-mails are examined to identify bottlenecks in the enterprise computer system. Upon identifying the bottlenecks, the enterprise computer system is simulated, and simulations of replacement components, which the computer-based analysis has deemed appropriate for curing the bottlenecks, are installed in the simulated system. If the computer simulation with the replacement components cures the bottlenecks and causes no new problems for the enterprise computer system, then corresponding actual replacement components are installed in the enterprise computer system.

12 Claims, 2 Drawing Sheets

MODIFYING AN INFORMATION TECHNOLOGY ARCHITECTURE FRAMEWORK

The present application is a continuation of U.S. patent application Ser. No. 12/169,749, filed on Jul. 9, 2008, and entitled, "Modifying an Information Technology Architecture Framework," which is herein incorporated by reference in its entirety.

BACKGROUND

The present disclosure relates in general to the field of computers, and more particularly to Information Technology (IT) architecture framework. Still more particularly, the present disclosure relates to improving an architecture framework using a "bottom up" architecture improvement methodology.

An enterprise Information Technology (IT) architecture ("architecture") is defined as a combination of hardware and software that is used to perform text, data, website, multimedia and other computer related processing for an enterprise. An enterprise IT architecture framework ("framework") is defined as a model (i.e., a "blueprint") of the enterprise IT architecture. Thus, the framework describes a high level view of the architecture, and the architecture describes components of an IT system in finer detail.

The interplay between an architecture and a framework (a.k.a., "architecture framework") leads to problems when attempting to improve an existing IT system. That is, systems engineers typically choose between evaluating and improving either the architecture or the framework, but do not contemplate an interaction between the two.

SUMMARY

A computer-based analysis of an enterprise computer system is utilized to remove bottlenecks that cause the enterprise computer system to operate in a non-optimal or risky manner. Contents of e-mails are examined to identify bottlenecks in the enterprise computer system. Upon identifying the bottlenecks, the enterprise computer system is simulated, and simulations of replacement components, which the computer-based analysis has deemed appropriate for curing the bottlenecks, are installed in the simulated system. If the computer simulation with the replacement components cures the bottlenecks and causes no new problems for the enterprise computer system, then corresponding actual replacement components are installed in the enterprise computer system.

The above as well as additional objectives, features, and advantages of the present invention will become apparent in the following detailed written description.

BRIEF DESCRIPTION OF THE SEVERAL VIEWS OF THE DRAWINGS

The invention itself, as well as an illustrative mode of use, further objects, and advantages thereof, will best be understood by reference to the following detailed description of an illustrative embodiment when read in conjunction with the accompanying drawings, wherein.

DETAILED DESCRIPTION

Figure 1:
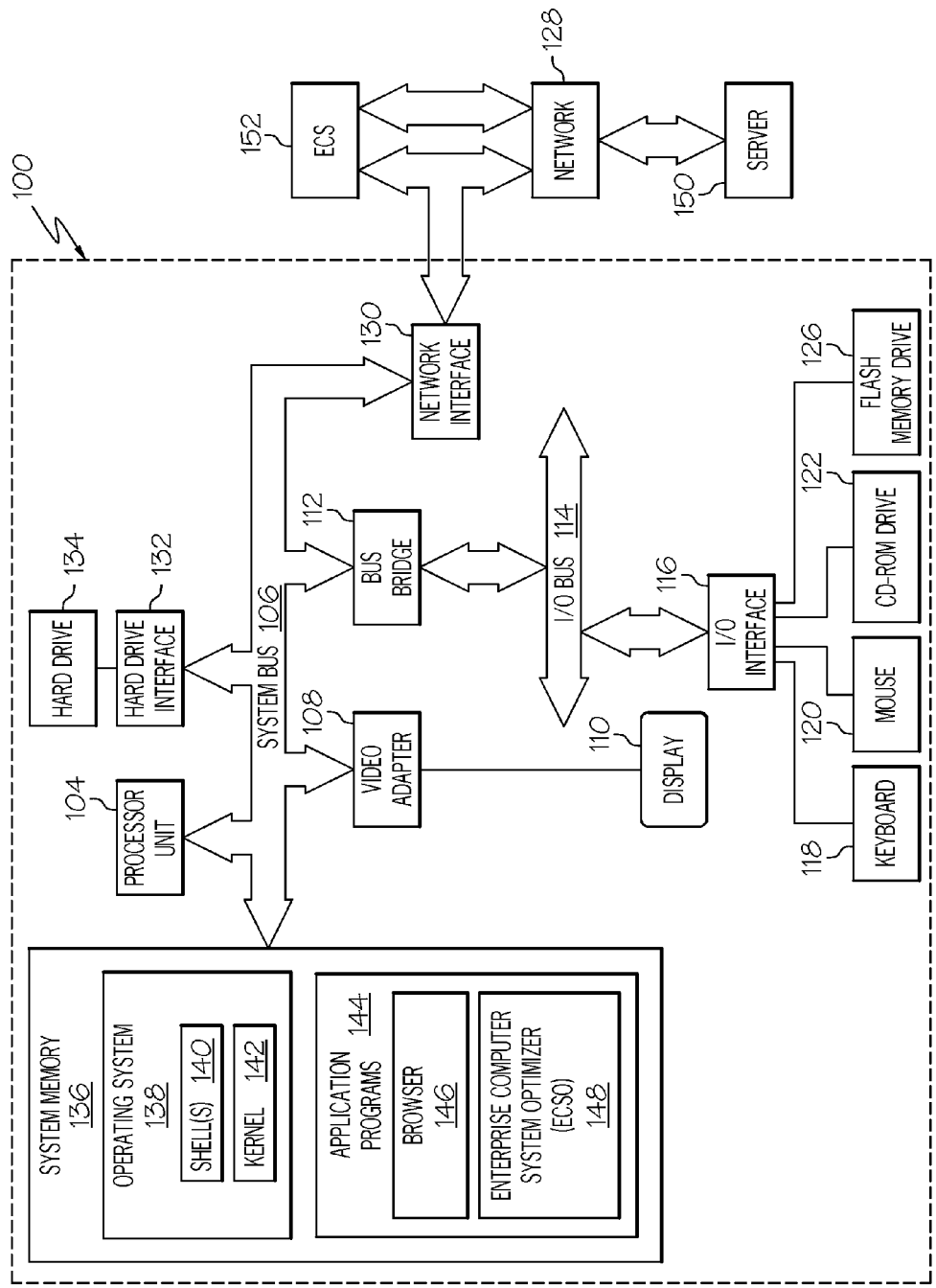
FIG. 1 depicts an exemplary computer in which the present invention may be implemented.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present invention may be written in an object oriented programming language such as Java® (Java® is a trademark or registered trademark of Sun Microsystems, Inc. in the United States and other countries), Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatuses (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

With reference now to FIG. 1, there is depicted a block diagram of an exemplary computer 100, with which the present invention may be utilized. Computer 100 includes a processor unit 104 that is coupled to a system bus 106. A video adapter 108, which drives/supports a display 110, is also coupled to system bus 106. System bus 106 is coupled via a bus bridge 112 to an Input/Output (I/O) bus 114. An I/O interface 116 is coupled to I/O bus 114. I/O interface 116 affords communication with various I/O devices, including a keyboard 118, a mouse 120, a Compact Disk-Read Only Memory (CD-ROM) drive 122, and a flash memory drive 126. The format of the ports connected to I/O interface 116 may be any known to those skilled in the art of computer architecture, including but not limited to Universal Serial Bus (USB) ports.

Computer 100 is able to communicate with a server 150 via a network 128 using a network interface 130, which is coupled to system bus 106. Network 128 may be an external network such as the Internet, or an internal network such as an Ethernet or a Virtual Private Network (VPN).

A hard drive interface 132 is also coupled to system bus 106. Hard drive interface 132 interfaces with a hard drive 134. In one embodiment, hard drive 134 populates a system memory 136, which is also coupled to system bus 106. System memory 136 is defined as a lowest level of volatile memory in computer 100. This volatile memory may include additional higher levels of volatile memory (not shown), including, but not limited to, cache memory, registers, and buffers. Code that populates system memory 136 includes an operating system (OS) 138 and application programs 144.

OS 138 includes a shell 140, for providing transparent user access to resources such as application programs 144. Generally, shell 140 (as it is called in UNIX®—UNIX is a registered trademark of The Open Group in the United States and other countries) is a program that provides an interpreter and an interface between the user and the operating system. Shell 140 provides a system prompt, interprets commands entered by keyboard 118, mouse 120, or other user input media, and sends the interpreted command(s) to the appropriate lower levels of the operating system (e.g., kernel 142) for processing. As depicted, OS 138 also includes kernel 142, which includes lower levels of functionality for OS 138. Kernel 142 provides essential services required by other parts of OS 138 and application programs 144. The services provided by kernel 142 include memory management, process and task management, disk management, and I/O device management. Note that UNIX® is merely an exemplary OS that can be utilized by the presently described computer 100, which may utilize any other appropriate OS, including, but not limited to, Windows® (Windows® is a registered trademark of Microsoft, Inc. in the United States and other countries), Linux® (Linux® is a registered trademark of Linus Torvalds in the United States and other countries), etc.

Application programs 144 include a browser 146. Browser 146 includes program modules and instructions enabling a World Wide Web (WWW) client (i.e., computer 100) to send and receive network messages to the Internet. Computer 100 may utilize HyperText Transfer Protocol (HTTP) messaging to enable communication with server 150. Application programs 144 in system memory 136 also include an Enterprise Computer System Optimizer (ECSO) 148. ECSO 148 is software that performs the functions described in the figures below. In one embodiment, computer 100 is able to download ECSO 148 from service provider server 150, including in an "on demand" basis. In another embodiment, service provider server 150 performs all of the functions associated with the present invention (including execution of ECSO 148), thus freeing computer 100 from using its own resources.

Note that ECSO 148 is able to monitor activities, as described below, or an Enterprise Computer System (ECS) 152, which is coupled to computer 100 either directly via the network interface 130, or indirectly via the network 128. ECS 152 is preferably an enterprise system that is made up of multiple computers, servers, storage devices, printers, etc. that utilize some or all of the architecture shown for computer 100. Thus, computer 100 functions as a monitoring computer that oversees the ECS 152 in a manner described below, and then creates an optimized architecture framework for ECS 152 using replacement components in the architecture of ECS 152.

The hardware elements depicted in computer 100 are not intended to be exhaustive, but rather represent and/or highlight certain components that may be utilized to practice the present invention. For instance, computer 100 may include printers, alternate memory storage devices such as magnetic cassettes, Digital Versatile Disks (DVDs), Bernoulli cartridges, and the like. These and other variations are intended to be within the spirit and scope of the present invention.

Figure 2:
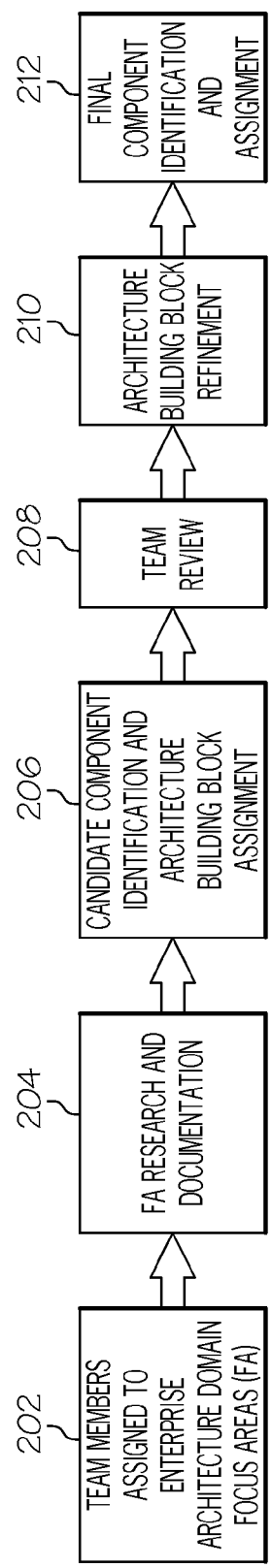
FIG. 2 is a high-level flow-chart of exemplary steps taken to create an improved architecture framework.

With reference now to FIG. 2, a high-level flow chart of exemplary steps taken to optimize an enterprise computer system in order to create an improved architecture framework is presented. As depicted in initial block 202, the process may begin by assigning team members to enterprise architecture Focus Areas (FAs). These FAs focus on business pain points, which have been previously identified, by a computer such as computer 100, for an enterprise computer system such as ECS 152 shown in FIG. 1. Pain points are defined as conditions that lead to a reduced efficiency of total operations of the ECS 152. Examples of such pain points in ECS 152 that are identified computer 100 include, but are not limited to, the following:

Computer repair work orders—ECSO 148, shown in FIG. 1, may identify a history of repair work orders for elements within ECS 152. This history may be stored in a database within computer 100, and may be identified by flags in the database.

Load balancing—ECSO 148 may also identify excessive or improper load balancing between components within ECS 152. For example, if a first server has to help a second server beyond some pre-defined limit set by ECSO 148, then this indicates that there is some type of operational deficiency in the second server, which is not able to handle its own assigned workload.

Bottlenecks—ECSO 148 may also identify work and/or data transmission bottlenecks between components of ECS 152. For example, ECSO 148 may monitor one or more processors found in ECS 152 that have a recorded history of stalls that have occurred due to waiting for processing results from a particular processor that is repeatedly slow to handle requested jobs, such as a co-processing job. Similarly, a particular piece of software may be identified in ECS 152 that has a history of causing other software components (applications, routines, etc.) to stall. For example, web pages running in ECS 152 may have to wait repeatedly for a media file that is slow to upload into the web pages.

E-mail failures—ECSO 148 may also identify e-mail failures that repeatedly occur within ECS 152. ECSO 148 can identify the root cause of such failures (e.g., mistyping of e-mail addresses by users, exceeding daily e-mail usage limits set by a service, exceeding attachment limits for attachments to an e-mail, hardware failures in an e-mail server, etc.) by the use of flags, error messages, etc. that are interpreted by ECSO 148.

Unauthorized computer usage—ECSO 148 can monitor for and detect improper computer usage, such as downloading games, video clips, etc. that cause the system to slow down, using resources of ECS 152 for personal use, including Voice Over IP (VoIP) phone calls, etc.

Besides the pain points that are identified by computer 100, human team members in the FAs can also identify pain points, which are then input into computer 100, which utilizes software logic to create optimization solutions. Examples of pain points identified by team members include, but are not limited to, the following:

Building layout faults—These problems include those identified by a risk analysis performed by the team members. Such a risk analysis may identify an improper design and/or layout of a building in which employees of the enterprise utilize computer equipment. This improper design/layout may lead to supply deliveries of physical products (i.e., paper, drinks, etc.) being dropped against sensitive computer equipment; botanical plants being positioned over sensitive computer equipment, such that watering the plant may result in water overflow that damages the equipment; sensitive equipment being stored in a basement that is prone to flooding; etc.

Language, environmental and cultural issues—Besides issues such as language barriers (e.g., supplying an English QWERTY keyboard to a user who writes in a Cyrillic-based language), other cultural, language and environmental issues may also arise, particularly in third world countries. For example, power outages in third world countries are often common. If unaddressed (e.g., by a long-term uninterruptable power supply (UPS) such as a diesel-powered generator), these power outages may cause repeated problems. Similarly, a third-world environment may be particularly sandy, dusty, humid, etc., which will impact on computer components if not protected against. Furthermore, citizens of any country may adhere to religious/cultural practices that may raise a conflict with how a computer system is to be used/maintained, such as prohibitions against working at certain times or on certain days, etc.

Note that the team, which is referenced in block 202, is made up of multiple team members, which have been qualified by ECSO 148 according to each person's experience, training and performance grades. Note again, however, that while team members performs some of the overseeing duties required by the present invention, most of the processes must be performed by a computer, due to a requirement to automatically process and analyze pain point signals (e.g., flags), process extremely complex and numerous signals from a large number of components in the ECS 152 being evaluated, etc.

With reference to block 204 of FIG. 2, the computer 100 (and, alternatively, members of the team) then researches and documents the pain points of the system (including, but not limited to, those pain points described above). For example, the computer 100 can crawl databases, e-mails, alarm points, etc. to quickly identify all components that are underperforming or nonperforming. This process leads to a pinpoint identification of which component within the ECS 152 is causing or experiencing (or may cause or experience in the future) the pain point(s) identified in the process depicted in block 204.

As depicted in block 206, once the candidate components that are causing/experiencing or may in the future cause/experience the pain points are identified, a simulation of the ECS 152 is launched using simulated replacement components for the candidate components that have been identified as pain producers/experiencers. This simulation is a software simulation of all components, both hardware and software, found in the ECS 152.

As depicted in block 208, the computer and/or team then review the software simulation to determine if the pain points have been removed. This review includes using new components, preferably in a hands-on manner by team members if technically feasible, in order to confirm that the new components do not violate any concern or cause any of the pain points described above.

After the team and computer 100 fine tune the selection process for the new components (block 210), actual hardware/software that was modeled by the simulated replacement components are then installed into the physical ECS 152. At that point (block 212), the computer 100 finalizes the replacement components by relabeling them and their subcomponents (which may not be new). Computer 100 then monitors the ECS 152 to determine if any new pain points (which were not previously recognized and/or defined) have occurred, or if any old pain points still remain in the originally troublesome component or any other component (which was previously not experiencing pain).

Thereafter, computer 100 creates an improved framework for ECS 152 that uses the new components. That is, by populating an original architecture framework with the new components, a new architecture framework is defined according to the functionality of, features of and new interrelationships created by the new components.

As described herein, the present invention defines a novel approach to defining an improved framework using a "bottom up" approach, in which the new components in the architecture set the definition for the new architecture framework. This allows a monitoring computer to automatically upgrade the architecture framework of a system that is under review, thus allowing a system engineer to focus on root causes of pain points and to be involved in the selection of needed upgrade components.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to preferred embodiments thereof, it will be apparent that modifications and variations are possible without departing from the scope of the invention defined in the appended claims.

What is claimed is:

1. A method of optimizing a real enterprise computer system to create an improved architecture framework, the computer-implemented method comprising:
   identifying, by a monitoring computer, a bottleneck between a first component and a second component in a real enterprise computer system, wherein the real enterprise computer system conforms to an initial architecture framework;
   simulating, by one or more processors, the real enterprise computer system as a simulated system;
   in response to determining that the bottleneck is caused by a particular processor that has a recorded history of causing stalls to other processors that were waiting for processing results from the particular processor, replacing, by one or more processors, a simulation of the particular processor in the simulated system with a simulated replacement processor, wherein the simulated replacement processor simulates a real replacement processor that the monitoring computer has determined will eliminate the bottleneck;
   in response to determining that the bottleneck is caused by a particular piece of software that has a history of causing other software components to stall, replacing, by one or more processors, a simulation of the particular piece of software in the simulated system with a simulated replacement software component, wherein the simulated replacement software component simulates a real replacement software component that the monitoring computer has determined will eliminate the bottleneck;
   launching, by one or more processors, the simulated system;
   in response to detecting any new bottlenecks, reevaluating and replacing, by one or more processors, simulated processors and simulated software in the simulated system until all bottlenecks are removed;
   installing the real replacement processor and the real replacement software component in the real enterprise computer system; and
   automatically upgrading, by one or more processors, the initial architecture framework to an improved architecture framework, wherein the improved architecture framework implements the real replacement processor and the real replacement software component in an architecture of the real enterprise computer system.

2. The method of claim 1, further comprising:
   identifying the particular processor that caused the bottleneck as having a history of excessive repair work orders.

3. The method of claim 1, further comprising:
   identifying the particular processor that caused the bottleneck as having a history of repeated failures to transmit e-mail messages.

4. The method of claim 1, further comprising:
   determining that the particular processor with the recorded history of causing stalls to other processors had said stalls due to repeated power outages to a power supply to said particular processor.

5. A system comprising:
   a processor;
   a data bus coupled to the processor;
   a memory coupled to the data bus; and
   a computer-usable medium embodying computer program code, the computer program code comprising instructions executable by the processor and configured for optimizing an enterprise computer system by performing the steps of:
   identifying, by a monitoring computer, a bottleneck between a first component and a second component in a real enterprise computer system, wherein the real enterprise computer system conforms to an initial architecture framework;
   simulating the real enterprise computer system as a simulated system;
   crawling a content of e-mails to identify a particular processor and a particular piece of software that are causing the bottleneck;
   in response to said crawling determining that the bottleneck is caused by the particular processor having a recorded history of causing stalls to other processors that were waiting for processing results from the processor, replacing a simulation of the particular processor in the simulated system with a simulated replacement processor, wherein the simulated replacement processor simulates a real replacement processor that the monitoring computer has determined will eliminate the bottleneck;
   in response to said crawling determining that the bottleneck is caused by the particular piece of software having a history of causing other software components to stall, replacing a simulation of the particular piece of software in the simulated system with a simulated replacement software component, wherein the simulated replacement software component simulates a real replacement software component that the monitoring computer has determined will eliminate the bottleneck;
   launching the simulated system;
   in response to detecting any new bottlenecks, reevaluating and replacing simulated processors and simulated software in the simulated system until all bottlenecks are removed;
   installing the real replacement processor and the real replacement software component in the real enterprise computer system; and
   automatically upgrading the initial architecture framework to an improved architecture framework, wherein the improved architecture framework implements the real replacement processor and the real replacement software component in an architecture of the real enterprise computer system.

6. The system of claim 5, wherein said crawling the content of e-mails identifies the particular processor that caused the bottleneck as having a history of excessive repair work orders.

7. The system of claim 5, wherein said crawling the content of e-mails identifies the particular processor that caused the bottleneck as having a history of repeated failures to transmit e-mail messages.

8. The system of claim 5, wherein the computer program code further comprises instructions executable by the processor to perform the steps of:

determining that the particular processor with the recorded history of causing stalls to other processors had said stalls due to repeated power outages to a power supply to said particular processor.

9. A non-transitory computer-readable medium on which is stored a computer program, the computer program comprising computer executable instructions configured for:

identifying, by a monitoring computer, a bottleneck between a first component and a second component in a real enterprise computer system, wherein the real enterprise computer system conforms to an initial architecture framework;

simulating the real enterprise computer system as a simulated system;

crawling a content of e-mails to identify a particular processor and a particular piece of software that are causing the bottleneck;

in response to said crawling determining that the bottleneck is caused by the particular processor having a recorded history of causing stalls to other processors that were waiting for processing results from the processor, replacing a simulation of the particular processor in the simulated system with a simulated replacement processor, wherein the simulated replacement processor simulates a real replacement processor that the monitoring computer has determined will eliminate the bottleneck;

in response to said crawling determining that the bottleneck is caused by the particular piece of software having a history of causing other software components to stall, replacing a simulation of the particular piece of software in the simulated system with a simulated replacement software component, wherein the simulated replacement software component simulates a real replacement software component that the monitoring computer has determined will eliminate the bottleneck;

launching the simulated system;

in response to detecting any new bottlenecks, reevaluating and replacing simulated processors and simulated software in the simulated system until all bottlenecks are removed;

installing the real replacement processor and the real replacement software component in the real enterprise computer system; and automatically upgrading the initial architecture framework to an improved architecture framework, wherein the improved architecture framework implements the real replacement processor and the real replacement software component in an architecture of the real enterprise computer system.

10. The non-transitory computer-readable medium of claim 9, wherein said crawling the content of e-mails identifies the particular processor that caused the bottleneck as having a history of excessive repair work orders.

11. The non-transitory computer-readable medium of claim 9, wherein said crawling the content of e-mails identifies the particular processor that caused the bottleneck as having a history of repeated failures to transmit e-mail messages.

12. The non-transitory computer-readable medium of claim 9, wherein the computer program further comprises computer executable instructions configured for:

determining that the particular processor with the recorded history of causing stalls to other processors had said stalls due to repeated power outages to a power supply to said particular processor.

\* \* \* \* \*